US012687227B2

(12) United States Patent　　　　　　(10) Patent No.:　US 12,687,227 B2
Teeling et al.　　　　　　　　　　　　　(45) Date of Patent:　　　Jul. 21, 2026

(54) SEAL ASSEMBLY FOR A REPLACEABLE LIQUID DISPENSER CARTRIDGE

(71) Applicant: Delaware Capital Formation, Inc., Wilmington, DE (US)

(72) Inventors: Matthew Teeling, Andover (GB); Zach E. Alsdorf, Batavia, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 230 days.

(21) Appl. No.: 18/532,806

(22) Filed: Dec. 7, 2023

(65) Prior Publication Data

US 2024/0191799 A1　　Jun. 13, 2024

Related U.S. Application Data

(60) Provisional application No. 63/386,540, filed on Dec. 8, 2022.

(51) Int. Cl.
　　*F16J 15/3204*　　　(2016.01)
　　*F16K 3/02*　　　　(2006.01)
　　*F16K 3/16*　　　　(2006.01)
(52) U.S. Cl.
　　CPC ......... *F16J 15/3204* (2013.01); *F16K 3/0227* (2013.01); *F16K 3/16* (2013.01)
(58) Field of Classification Search
　　CPC ....... F16J 15/3204; F16K 3/0227; F16K 3/16; G01F 11/16; A47K 5/1202
　　USPC ..... 222/143, 321.5, 322, 336–337, 378, 636
　　See application file for complete search history.

(56) References Cited

U.S. PATENT DOCUMENTS

| | | | | |
|---|---|---|---|---|
| 911,834 | A | * | 2/1909 | Morrill .................. B65D 35/40 |
| | | | | 222/322 |
| 919,017 | A | * | 4/1909 | Jackson .............. A01M 21/043 |
| | | | | 405/40 |
| 997,939 | A | * | 7/1911 | Wah ....................... B65D 35/40 |
| | | | | 222/453 |
| 1,165,673 | A | * | 12/1915 | Holmes .................. B65D 35/40 |
| | | | | 119/72.5 |
| 1,260,334 | A | | 3/1918 | Cordley |
| 1,312,246 | A | * | 8/1919 | Gehringer ........... A01M 21/043 |
| | | | | 111/7.3 |
| 1,334,769 | A | * | 3/1920 | McClain .............. A47K 5/1214 |
| | | | | 222/401 |
| 1,423,393 | A | * | 7/1922 | Boston ................. B65D 47/248 |
| | | | | 215/311 |

(Continued)

*Primary Examiner* — Paul R Durand
*Assistant Examiner* — Michael J. Melaragno
(74) *Attorney, Agent, or Firm* — Fish & Richardson P.C.

(57)　　　　　　ABSTRACT

A seal assembly for selectively sealing an open end of a liquid supply cartridge is provided. The seal assembly includes a seal body having an annular sidewall that extends between a first end and an opposite second end, a base wall having an opening defined by an annular sealing member, and a yoke that projects from the base wall so as to be coaxial with the opening and a central axis of the seal assembly. The seal assembly further includes a shuttle movably retained within the seal body by the yoke and having a plunger configured to seal closed the opening and a biasing element located between the shuttle and the yoke for biasing the shuttle in a direction toward the opening formed in the base wall of the seal body. The shuttle being movable between at least a parked position, an open position, and an intermediate closed position.

25 Claims, 14 Drawing Sheets

(56) References Cited

U.S. PATENT DOCUMENTS

| | | | | |
|---|---|---|---|---|
| 1,424,862 A * | 8/1922 | Vredenburgh | ....... | B65D 47/248 |
| | | | | 222/518 |
| 1,454,284 A * | 5/1923 | Holmes | ............... | A47K 5/1202 |
| | | | | 222/445 |
| 1,739,393 A * | 12/1929 | Harmon | ............... | B65D 47/248 |
| | | | | 215/21 |
| 2,093,365 A | 9/1937 | Ransom et al. | | |
| 2,281,051 A * | 4/1942 | Roger | .................. | A47K 5/1214 |
| | | | | 222/378 |
| 2,453,080 A | 11/1948 | Shimp | | |
| 2,482,867 A * | 9/1949 | Picut | .................... | B65D 47/248 |
| | | | | 222/487 |
| 2,519,115 A | 8/1950 | Costakos | | |
| 2,706,583 A * | 4/1955 | Keith | .................. | A45D 33/025 |
| | | | | 222/246 |
| 2,751,254 A | 6/1956 | Kraft | | |
| 2,804,999 A * | 9/1957 | Keith | .................... | B65D 83/06 |
| | | | | 222/246 |
| 2,817,189 A * | 12/1957 | Esmay | ............... | A01M 21/043 |
| | | | | 220/301 |
| 2,842,294 A | 7/1958 | Crowder | | |
| 3,190,508 A * | 6/1965 | Petersen | ............... | B65D 83/52 |
| | | | | 239/350 |
| 3,987,791 A | 10/1976 | Chittenden et al. | | |
| 4,005,807 A | 2/1977 | Wiesner | | |
| 4,146,156 A | 3/1979 | Cassia | | |
| 4,210,262 A | 7/1980 | Donaldson | | |
| 4,210,263 A | 7/1980 | Bos | | |
| 4,345,627 A | 8/1982 | Cassia | | |
| 4,391,309 A | 7/1983 | Steiner | | |
| 4,971,231 A | 11/1990 | Faerber et al. | | |
| 5,022,558 A | 6/1991 | Faerber et al. | | |
| 5,215,214 A | 6/1993 | Lev et al. | | |
| 5,265,777 A * | 11/1993 | Weinstein | .......... | B65D 47/2006 |
| | | | | 222/525 |
| 5,593,065 A * | 1/1997 | Harrold | ................. | G01F 11/025 |
| | | | | 222/207 |
| 5,638,989 A | 6/1997 | Ophardt et al. | | |
| 5,645,197 A * | 7/1997 | Chen | ....................... | G01F 11/18 |
| | | | | 222/336 |
| 8,820,585 B1 * | 9/2014 | Banks | ....................... | A47K 5/14 |
| | | | | 222/145.5 |
| 9,919,323 B2 | 3/2018 | Kurchev et al. | | |
| 10,688,507 B2 | 6/2020 | Kurchev et al. | | |
| 11,709,084 B2 | 7/2023 | Teeling | | |
| 2005/0133525 A1 * | 6/2005 | Lewis | ................. | B05B 11/0072 |
| | | | | 222/1 |
| 2007/0295753 A1 | 12/2007 | Vangeel et al. | | |
| 2011/0132933 A1 * | 6/2011 | Ophardt | ............... | F04B 53/143 |
| | | | | 222/181.3 |
| 2012/0132668 A1 * | 5/2012 | Ophardt | ............... | F04B 7/0053 |
| | | | | 222/321.3 |
| 2012/0308405 A1 | 12/2012 | McNulty et al. | | |
| 2012/0325857 A1 * | 12/2012 | Ophardt | ............... | A47K 5/1207 |
| | | | | 222/325 |
| 2013/0037573 A1 * | 2/2013 | Spiegelberg | ............. | A47K 5/14 |
| | | | | 222/190 |
| 2013/0056552 A1 | 3/2013 | Teeling et al. | | |
| 2014/0091106 A1 * | 4/2014 | Ophardt | ............. | B05B 11/1001 |
| | | | | 222/181.3 |
| 2014/0217123 A1 * | 8/2014 | Ophardt | ............... | A47K 5/1217 |
| | | | | 222/190 |
| 2016/0221010 A1 | 8/2016 | Kurchev et al. | | |
| 2016/0279279 A1 * | 9/2016 | Wonnacott | .............. | A61L 9/048 |
| 2016/0333874 A1 * | 11/2016 | Indruk | .................... | F04B 15/00 |
| 2017/0014006 A1 * | 1/2017 | Ciavarella | .......... | B05B 11/1087 |
| 2017/0136479 A1 * | 5/2017 | Ophardt | ............... | B05B 12/008 |
| 2017/0144810 A1 * | 5/2017 | Birdsell | ................. | B65D 47/32 |
| 2018/0236469 A1 | 8/2018 | Kurchev et al. | | |
| 2018/0340622 A1 * | 11/2018 | Godfrey | ............... | F16K 15/021 |
| 2020/0197966 A1 | 6/2020 | Marshall et al. | | |
| 2021/0008576 A1 | 1/2021 | Kurchev et al. | | |
| 2021/0179418 A1 | 6/2021 | Marshall et al. | | |
| 2021/0404853 A1 | 12/2021 | Teeling | | |
| 2022/0055816 A1 * | 2/2022 | Darby | ................. | F16K 15/1845 |
| 2022/0135393 A1 | 5/2022 | Marshall et al. | | |
| 2023/0107497 A1 * | 4/2023 | Colomb | ................. | B65D 83/52 |
| | | | | 222/71 |
| 2024/0191799 A1 * | 6/2024 | Teeling | ............... | F16J 15/3204 |

* cited by examiner

SEAL ASSEMBLY FOR A REPLACEABLE LIQUID DISPENSER CARTRIDGE

CROSS-REFERENCE TO RELATED APPLICATIONS

This application claims the benefit under 35 U.S.C. § 119(e) of U.S. Patent Application No. 63/386,540, entitled "Seal Assembly For A Replaceable Liquid Dispenser Cartridge," filed Dec. 8, 2022, which is incorporated herein by reference in its entirety.

TECHNICAL FIELD

This invention generally relates to chemical dispensing, and more particularly to a replaceable cartridge for a liquid chemical dispenser.

BACKGROUND

The dispensing of liquid chemical products into a receptacle is a common requirement of many industries. By way of example, in the janitorial industry it is often desirable to dispense one or more chemicals, such as detergents, bleaches, disinfectants, sanitizers, etc., for application to floors, countertops, and other surfaces and areas. The chemicals may be added to a receptacle, such as a spray bottle or a bucket, and mixed with water or other diluent to form a solution. A number of dispensing systems have been developed for this purpose. By way of example, many systems use a refillable or replaceable chemical supply cartridge and a control valve to deliver chemical directly to the receptacle.

While these chemical dispensing systems operate for their intended purpose, there are a number of drawbacks for which manufacturers and chemical suppliers seek to improve, including minimizing chemical spillage during the installation and replacement of chemical supply cartridges. In that regard, when a chemical supply cartridge runs out of chemical, the chemical dispenser is no longer operational and the cartridge must be replaced to restore operation of the chemical dispenser. In many cases, replacement of the chemical supply cartridges is performed on a regular schedule by outside service technicians that come on-site to maintain the janitorial equipment. To this end, in addition to replacing empty chemical cartridges, a service technician may replace a partially empty chemical cartridge to ensure that the chemical dispenser has enough chemical supply to last until the next regularly scheduled service visit.

By way of example, when a chemical cartridge is installed or removed from the liquid dispenser for replacement, a certain amount of residual or unused chemical left in the cartridge may be spilt from the cartridge before it can be capped, for example, in a gravity-fed liquid dispenser that receives a chemical cartridge in an inverted orientation. In any event, as the chemicals held in the chemical cartridge may be potent concentrates that can be harmful to surfaces and skin, for example, it is desirable to limit any amount of spillage during the installation and replacement of chemical supply cartridges.

Therefore, it is desirable to provide a seal assembly for a replaceable chemical supply cartridge for a liquid chemical dispenser that prevents unwanted chemical spillage during the installation and replacement of the chemical supply cartridge.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
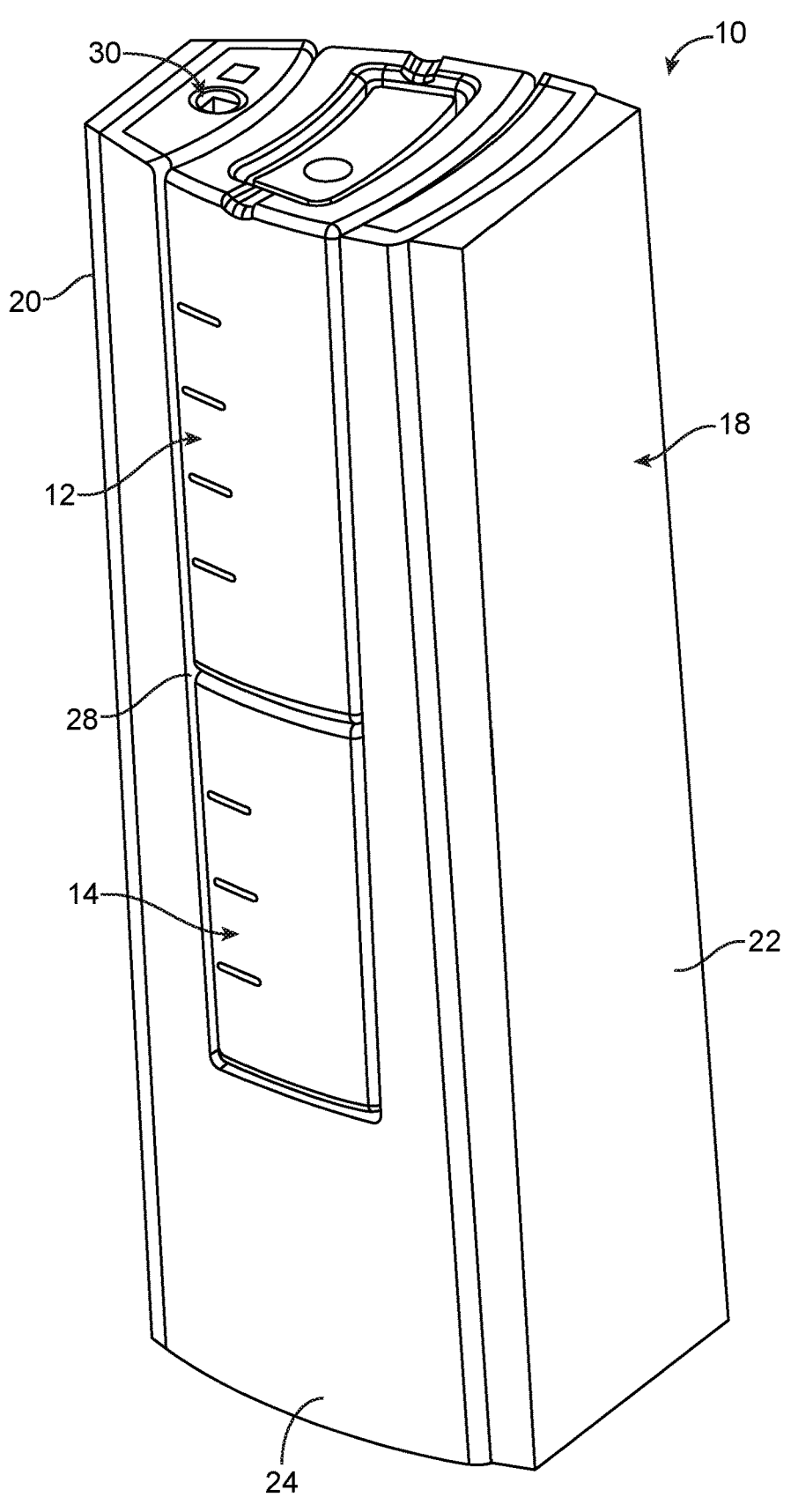
FIG. 1 is perspective view of an exemplary liquid dispenser of the type that receives a replaceable liquid supply cartridge in accordance with an embodiment of the present invention.
Figure 2:
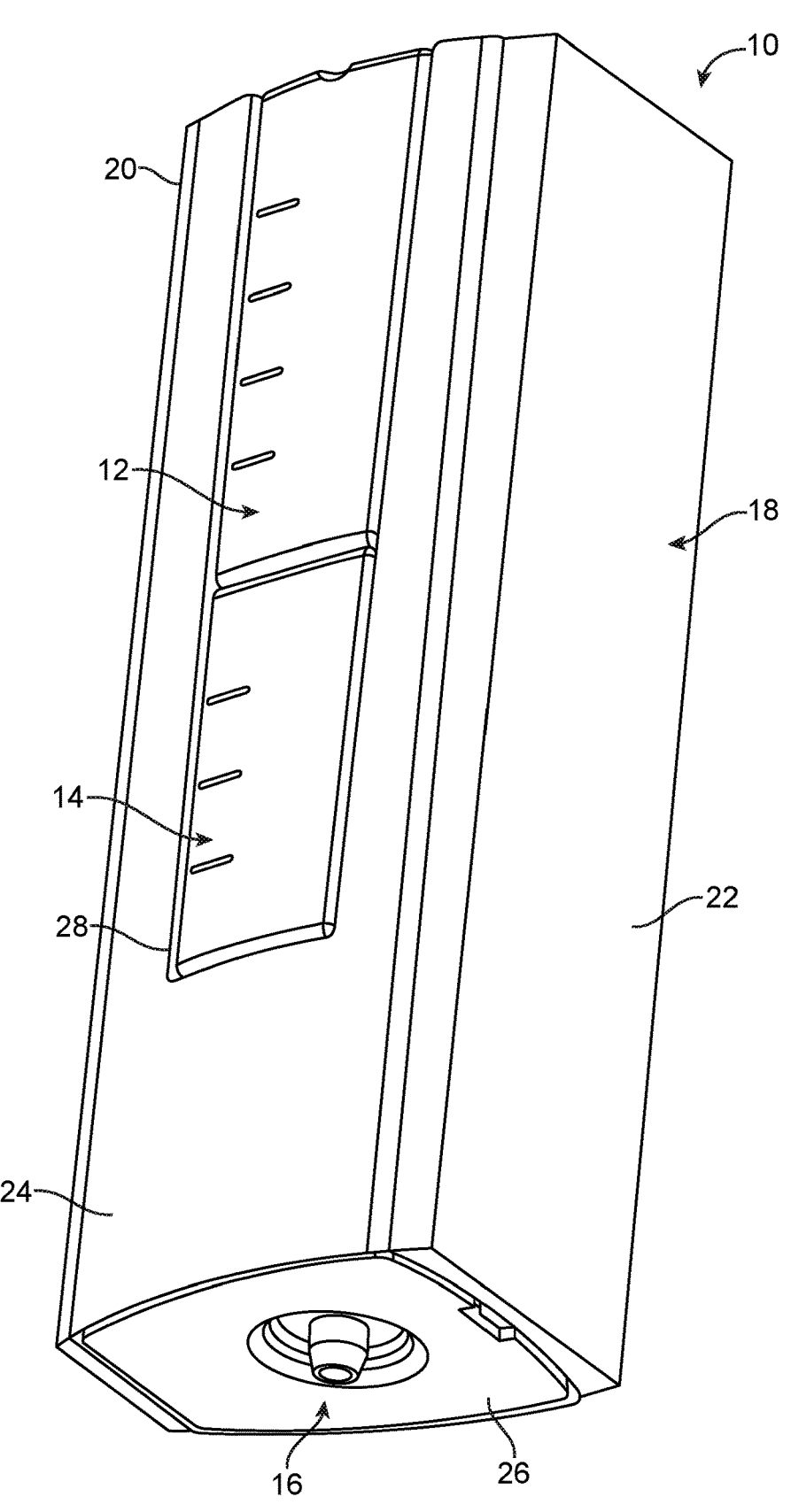
FIG. 2 is another perspective view of the liquid dispenser illustrated in FIG. 1.

With reference to FIGS. 1 and 2, an exemplary liquid dispenser 10 is shown with which a replaceable liquid supply cartridge having a seal assembly according to an embodiment of the present invention may be used. In that regard, the liquid dispenser 10 is of the type that receives a replaceable liquid supply cartridge 12 for dispensing a metered dose of liquid held in the supply cartridge 12, such as a chemical agent, into a separate receptacle (not shown). In particular, the liquid dispenser 10 is a gravity-fed dispenser configured to receive the liquid supply cartridge 12 in an inverted orientation. The exemplary liquid dispenser 10 includes an in-line reservoir 14 disposed between the liquid supply cartridge 12 and a control valve 16. As described in further detail below, the liquid supply cartridge 12 is connected to the reservoir 14 such that the reservoir 14 and the liquid supply cartridge 12 are in fluid communication. That way, liquid chemical product stored in the supply cartridge 12 may be supplied to the reservoir 14 for dispensing via the control valve 16. To this end, the reservoir 14 is configured to hold a volume of liquid product so that the liquid dispenser 10 may remain operational even after the liquid supply cartridge 12 runs out of product. The liquid dispenser 10 may further include a dosing tank (not shown) positioned between the reservoir 14 and the control valve 16 that ensures a precise amount of liquid is delivered to the receptacle when the control valve 16 is opened.

With continued reference to FIGS. 1-2, the liquid dispenser 10 includes a housing 18 for holding the elements of the liquid dispenser 10, including the liquid supply cartridge 12, the reservoir 14, and the control valve 16, for example. The housing 18 is generally rectangular or trapezoidal in shape and include a front wall 20, rear wall 22, and opposed sidewalls 24 extending between the front and rear walls 20, 22. The housing 18 may be generally open at its upper end but closed off at its lower end by a base wall 26. Each sidewall 24 includes a generally U-shaped slot 28 centrally located in the sidewalls 24 and extending longitudinally from the outer housing 18 toward the lower end. The purpose of the slots 28 is to allow a user or service technician to visually observe the amount of liquid product in the liquid supply cartridge 12 and the reservoir 14. Further, the slots 28 also allow a service technician to grasp the liquid supply cartridge 12 during a replacement or maintenance process. The housing 18 may further include a locking mechanism 30 proximate its upper end that is configured to secure the liquid supply cartridge 12 to the housing 18. In that regard, the locking mechanism 30 may include a locking element or arm (not shown) movable between a locked position and an unlocked position. To this end, when the locking element is moved to the locked position, a portion of the locking element extends into engagement with a feature, such as a groove, for example, formed in the liquid supply cartridge 12 to prevent the liquid supply cartridge 12 from being removed from the liquid dispenser 10. Other types of locking mechanisms, such as spring loaded clips or the like, are also possible.

Additional details of the exemplary liquid dispenser 10 are described in U.S. patent application Ser. No. 17/359,704 (owned by the Assignee of the present disclosure), the disclosure of which is expressly incorporated herein by reference in its entirety. However, while aspects of the present invention are shown and described in the context of a certain liquid dispenser 10 and replacement cartridge 12 design, it will be understood that the same inventive concepts related to aspects of the present invention may be implemented with different liquid dispenser and replacement cartridge designs and liquid dispensing applications and systems without departing from the scope of the present invention. More particularly, in its broader aspects, the inventive concepts related to the below-described seal assembly may be implemented in any application that requires a liquid valve seal for a liquid supply cartridge that prevents liquid spillage during installation and replacement of the liquid supply cartridge. More particularly, gravity-based dispensing systems may benefit from aspects of the present invention. To this end, the drawings are not intended to be limiting.

Figure 3:
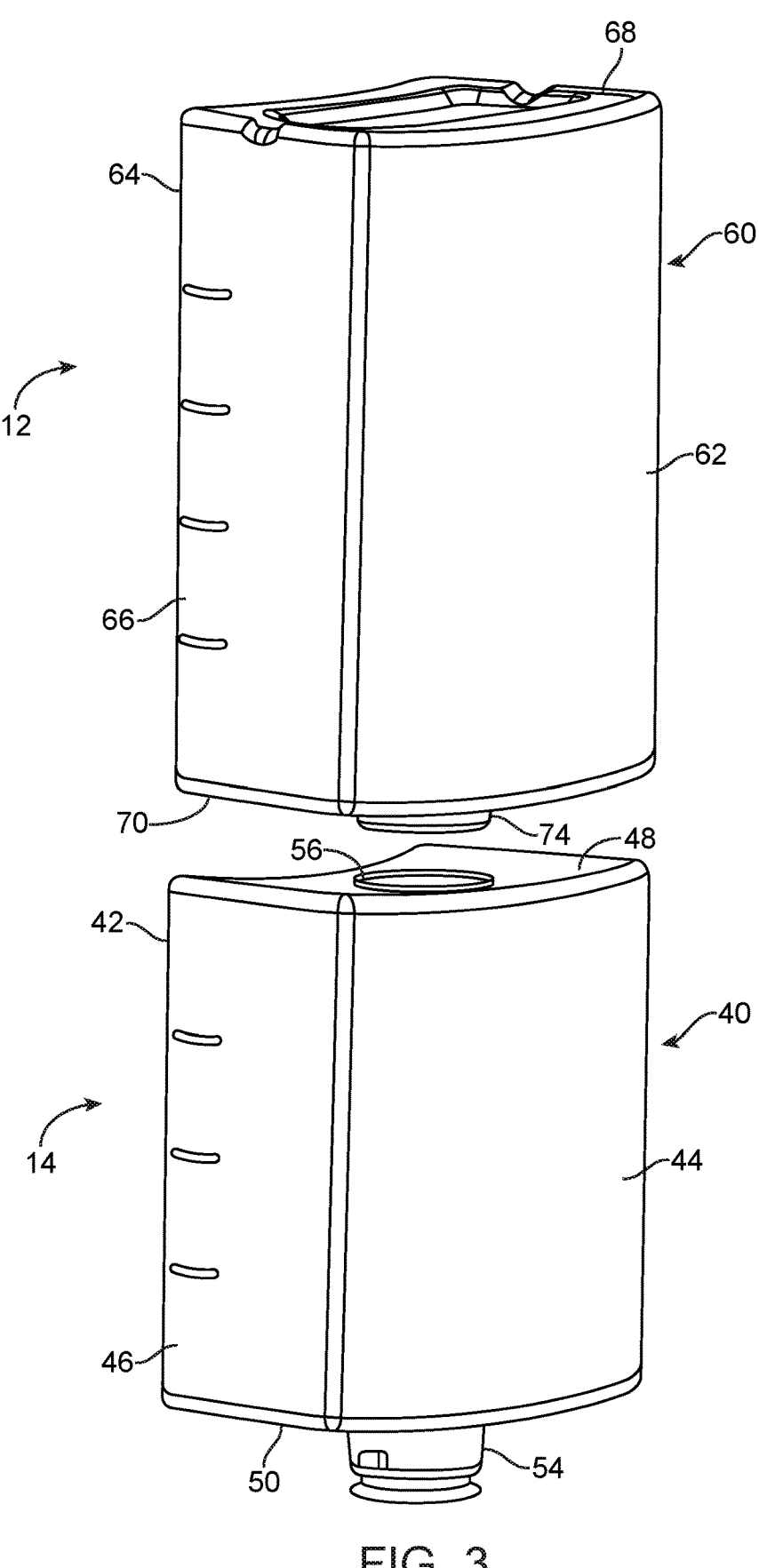
FIG. 3 is a disassembled perspective view illustrating details of a replaceable liquid supply cartridge and a reservoir of the liquid dispenser illustrated in FIGS. 1-2.
Figure 4:
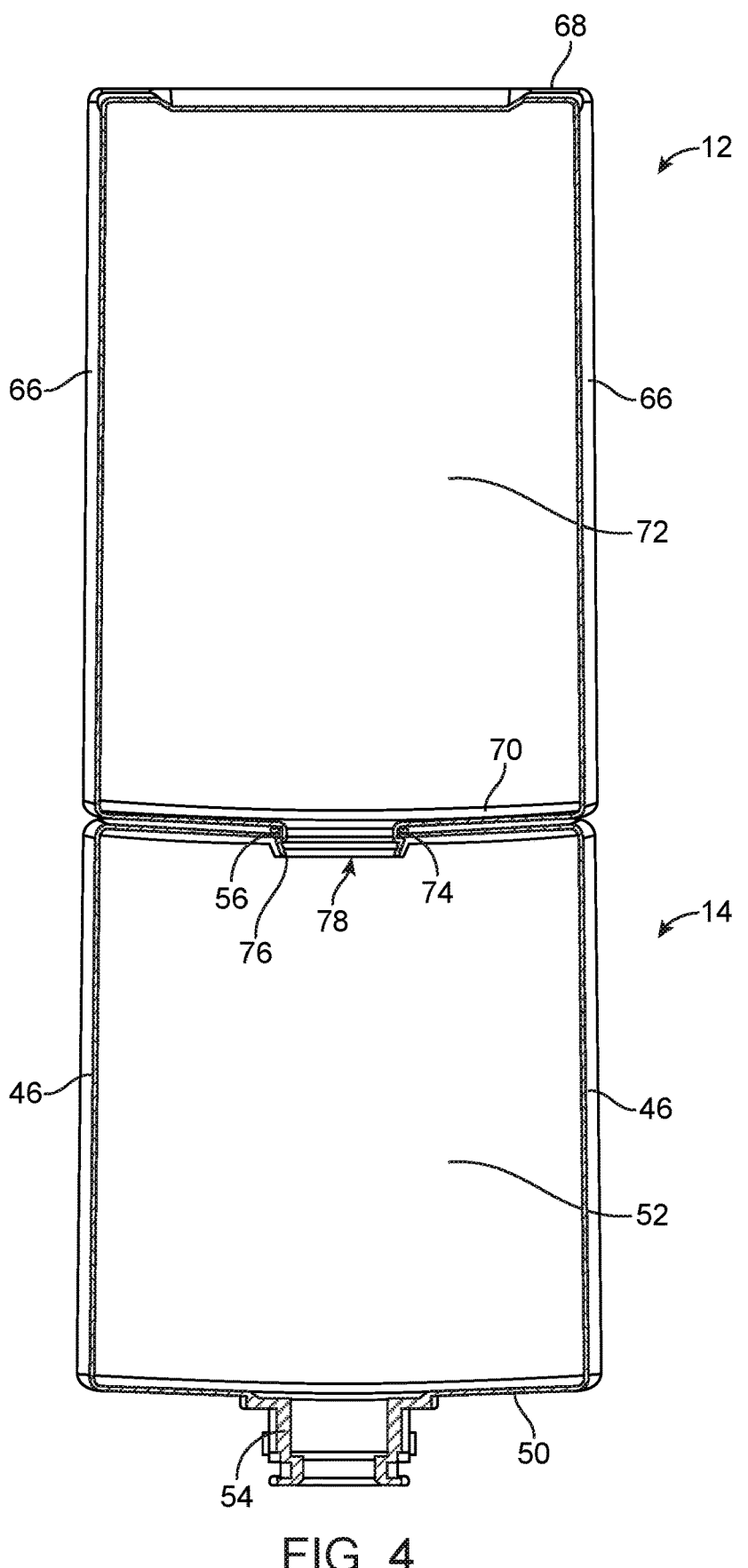
FIG. 4 is a cross-sectional view of the replaceable liquid supply cartridge and the reservoir FIGS. 1-3 fluidly connected.

Referring now to FIGS. 3-4, details of the replaceable liquid supply cartridge 12 and the reservoir 14, and in particular the fluid engagement therebetween, will now be described. In the exemplary embodiment, the reservoir 14 includes a generally rectangular body 40 having a front wall 42, rear wall 44, opposed sidewalls 46, upper wall 48, and lower wall 50 that collectively define an interior 52 for holding a volume of liquid product. The lower wall 50 of the body 40 of the reservoir 14 includes a neck 54 extending therefrom that defines a passageway that is open to the interior 52 of the reservoir 14. The neck 54 is configured to engage the liquid dispenser 10 to place the reservoir 14 in fluid communication with the control valve 16 and dosing tank for dispensing a metered dose of liquid product held in the reservoir 14. The upper wall 48 of the body 40 of the reservoir 14 includes an access port 56 for accessing the interior 52 of the body 40. As described in further detail below, the reservoir 14, and more particularly the access port 56, may include an actuator configured to engage the seal assembly 90 of the liquid supply cartridge 12 to place the interior 72 of the liquid supply cartridge 12 in fluid communication with the interior 52 of reservoir 14.

With continued reference to FIGS. 3-4, the liquid supply cartridge 12 includes a generally rectangular body 60 having a front wall 62, rear wall 64, opposed sidewalls 66, upper wall 68, and lower wall 70 that collectively define an interior 72 for holding a volume of liquid product. The lower wall 70 of the body 60 of the liquid supply cartridge 12 includes a neck 74 that extends from the lower wall 70 to an open end 76 to define a passageway 78 that is open to the interior 72 of the liquid supply cartridge 12. As illustrated in FIG. 4, the neck 74 is sized to be received in the access port 56 in the upper wall 48 of the reservoir 14 and extend therethrough such that the interior 72 of the liquid supply cartridge 12 is in fluid communication with the interior 52 of the reservoir 14. To this end, the neck 74 of the liquid supply cartridge 12 may include an O-ring disposed thereabout, for example, to facilitate engagement between the liquid supply cartridge 12 and the reservoir 14.

As briefly described above, when the liquid supply cartridge 12 is depleted or nearly depleted of liquid product, the used cartridge 12 is removed from the liquid dispenser 10 and replaced with a new cartridge 12. In that regard, the neck 74 of the cartridge 12 is removed from the access port 56 of the reservoir 14 so that the cartridge 12 may be withdrawn from the liquid dispenser 10. As the cartridge 12 is installed to the reservoir 14 in an inverted position, once the neck 74 has been removed from the access port 56 of the reservoir 14, any residual liquid product remaining in the used cartridge 12 may leak from the open end 76 of the neck 74. This is often the case even when the neck 74 of the used cartridge 12 includes a single use seal member, such as a pierceable seal, for example.

Figure 5:
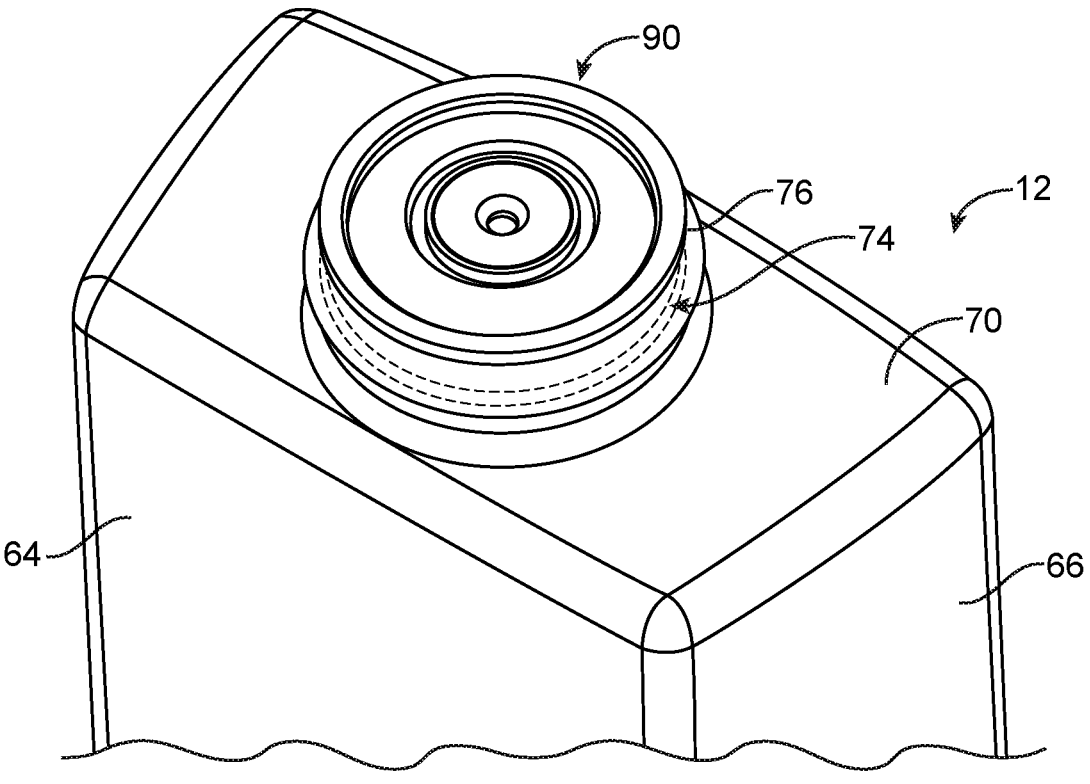
FIG. 5 is perspective view of the replaceable liquid supply cartridge of FIGS. 1-4 having a seal assembly in accordance with an embodiment of the present invention.
Figure 7:
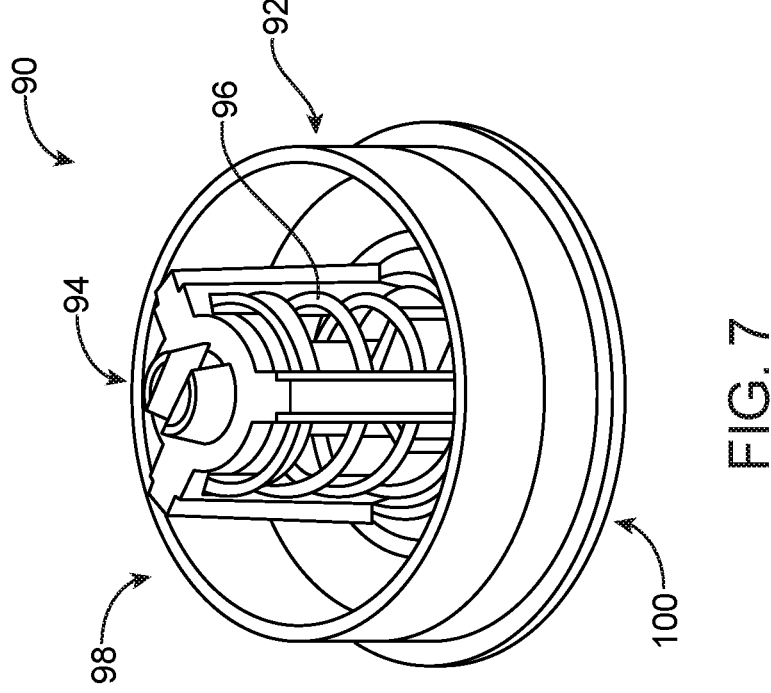
FIG. 7 is another perspective view of the seal assembly illustrated in FIGS. 5-6.
Figure 6:
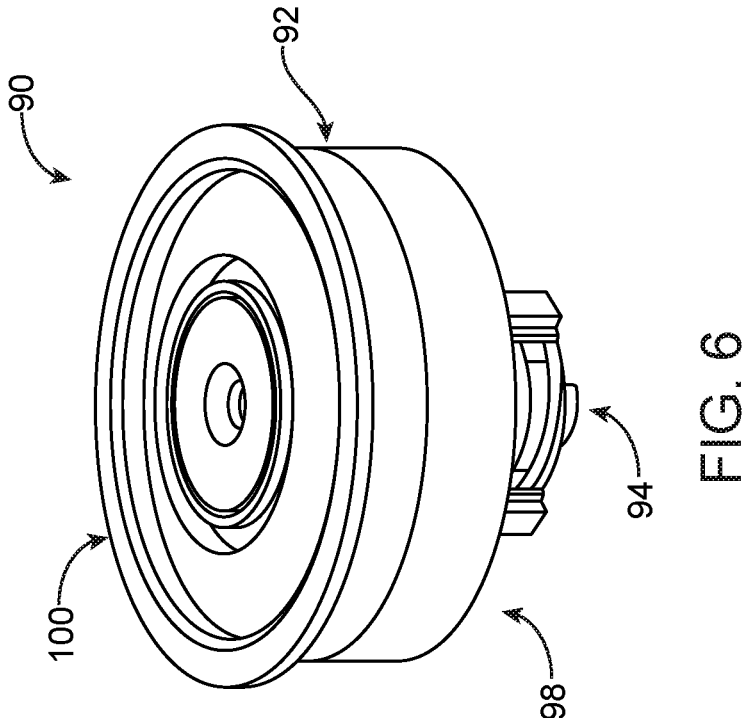
FIG. 6 is a perspective view of the seal assembly illustrated in FIG. 5.

Turning now with reference to FIGS. 5-9, details of a seal assembly 90 for use with the liquid supply cartridge 12 are shown in accordance with an embodiment of the invention and will now be described. As shown in FIG. 5, the seal assembly 90 is configured as an insert that may be installed into the open end 76 of the neck 74 of the cartridge 12 to selectively seal liquid chemical product in the cartridge 12. As will be described in further detail below, the seal assembly 90 is movable between at least a parked position, an open position, and an intermediate closed position. For example, the seal assembly 90 of a new, un-used liquid supply cartridge 12 that is filled with chemical product will be in the parked position to seal closed the supply cartridge 12 until the cartridge 12 is installed in the liquid dispenser 10, for example. When installed in the liquid dispenser 10, the seal assembly 90 is moved to the open position to place the liquid supply cartridge 12 in fluid communication with the reservoir 14 to transfer liquid product from the cartridge 12 to the reservoir 14. When the liquid supply cartridge 12 is disengaged from the reservoir 14 and removed from the liquid dispenser 10, the seal assembly 90 is moved to the intermediate closed position to substantially prevent or minimize leakage of any residual chemical product from the liquid supply cartridge 12. To this end, once the liquid supply cartridge 12 has been installed in the liquid dispenser 10 to place the liquid supply cartridge 12 in fluid communication with the reservoir 14, the seal assembly 90 may not return to the parked or fully sealed position. A fully sealed position is not necessary during the relatively short period of time that it takes to remove the cartridge 12 and reorient the cartridge 12 to its upright position. In other words, the intermediate closed position sufficiently obstructs the flow of chemical product from the cartridge 12 such that no chemical product or only a de minimis amount of chemical product escapes the cartridge 12 during the relatively short duration of cartridge 12 change out. These and other aspects of the present invention will be described in further detail below.

With continued reference to FIGS. 5-9, in an exemplary embodiment, the seal assembly 90 is generally cylindrical in shape to fit within the open end 76 of the neck 74 of the cartridge 12. In that regard, an outer diameter (OD) of the seal assembly 90 may be closely sized to an internal diameter (ID) of the neck 74 such that the fit between the seal assembly 90 and the neck 74 is a frictional or interference fit, for example. In an alternative embodiment, the seal assembly 90 may include an external thread to enable a threaded engagement between the seal assembly 90 and the neck 74 of the cartridge 12. In either case, the seal assembly 90 includes a generally tubular seal body 92 and a shuttle 94 movably retained by the seal body 92. The shuttle 94 is movable in an axial direction relative to the seal body 92 and along a central axis A1 (FIG. 9) of the seal assembly 90. The seal assembly 90 further includes a biasing element 96, such as a spring, sandwiched between the seal body 92 and the shuttle 94 for biasing the shuttle 94 in an axially downward direction that is away from a first end 98 of the seal body 92 and toward an opposite second end 100 of the seal body 92. As used herein, the axially downward direction is a direction along the central axis A1 that is from the first end 98 of the seal body 92 toward the second end 100 of the seal body 92. The axially upward direction is a direction along the central axis A1 that is from the second end 100 of the seal body 92 toward the first end 98. As will be described in further detail below, the shuttle 94 is movable between at least a parked position, an open position, and an intermediate closed position.

Figure 8:
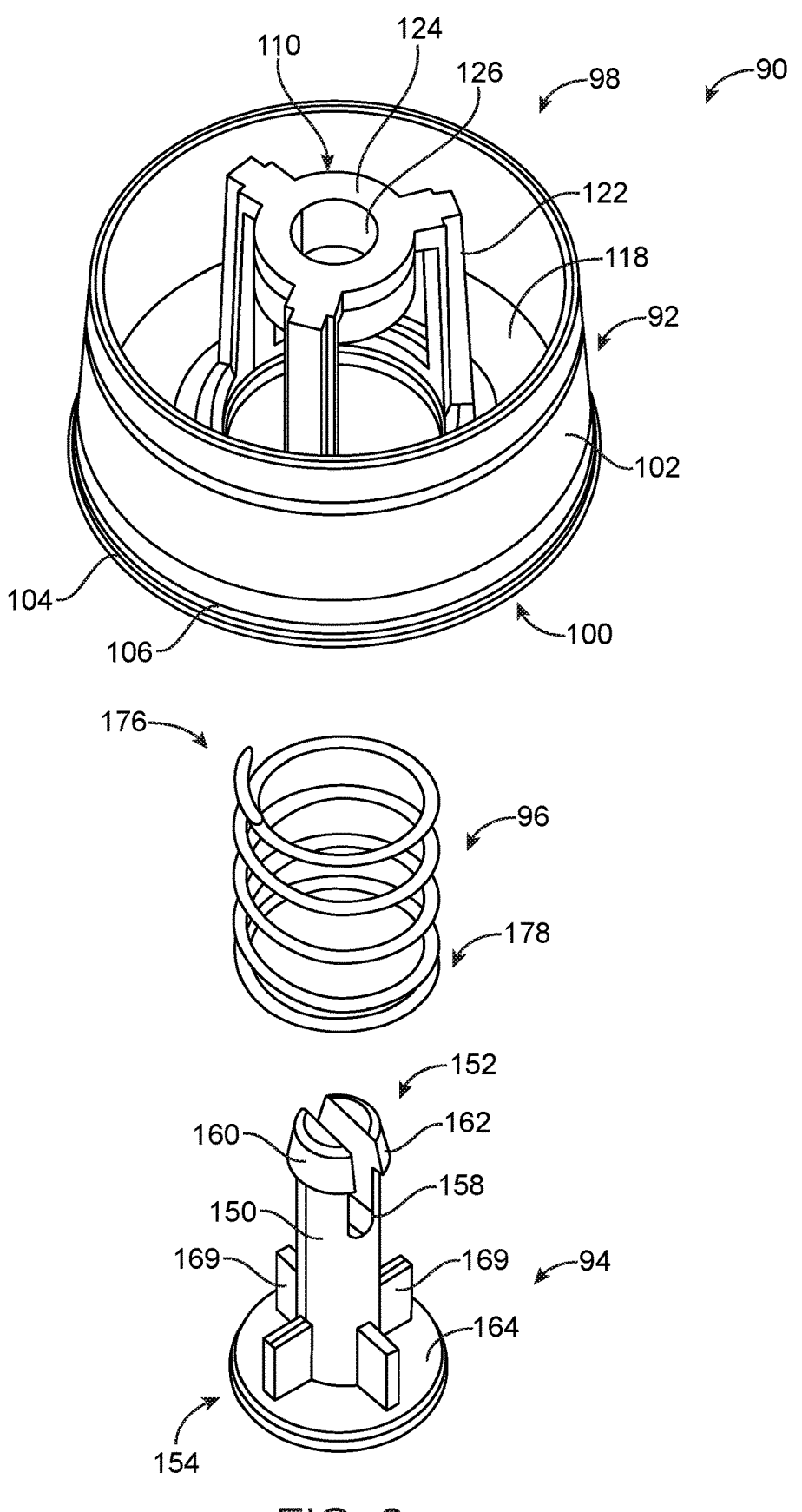
FIG. 8 is a disassembled perspective view of the seal assembly illustrated in FIGS. 5-7.
Figure 9:
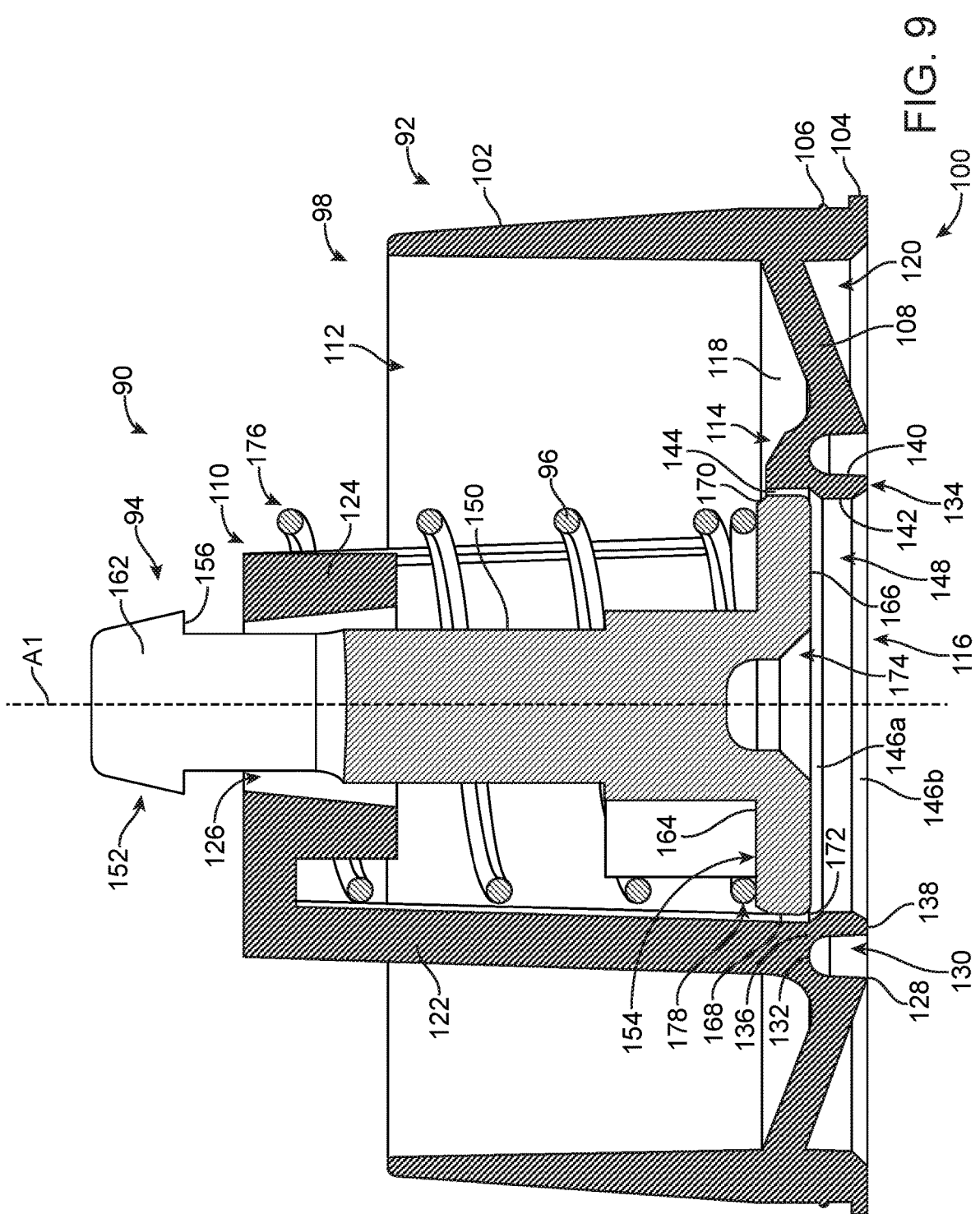
FIG. 9 is a cross-sectional view of the seal assembly illustrated in FIGS. 5-8.

Referring now to FIGS. 8-9, the seal body 92 includes an annular sidewall 102 that extends from the first end 98 to the second 100 to define the generally tubular shape of the seal body 92. As shown in FIG. 9, the annular sidewall 102 tapers in a direction from the second end 100 to the first end 98 of the seal body 92 to facilitate insertion of the seal assembly 90 into the open end 76 of the neck 74 of the cartridge 12. For example, a thickness of the sidewall 102 may be greater at the second end 100 compared to the first end 98 of the seal body 92. In the embodiment shown, the annular sidewall 102 may include an annular flange 104 at the second end 100 of the seal body 92 that is configured to abut the open end 76 of the neck 74 of the cartridge 12 to prevent over-insertion of the seal assembly 90 into the cartridge 12. The annular side 102 wall may also include an external annular rib 106 that is located proximate to the second end 100 of the seal body 92. As will be described in further detail below, in one embodiment, the annular rib 106 serves to retain the seal assembly 90 within the neck 74 of the cartridge 12. The seal body 92 further includes a base wall 108 at the second 100 and a centrally located yoke 110 that extends from the base wall 108 in an axial direction toward the first end 98 of the seal body 92. In that regard, the annular sidewall 102 extends circumferentially about the yoke 110 such that the yoke 110 and the annular sidewall 102 are coaxial. As shown in FIG. 9, for example, the yoke 110 may extend a distance beyond the open first end 98 of the seal body 92 to position a portion of the yoke 110 outside of a cavity 112 defined by the annular sidewall 102 and the base wall 108. As will be described in further detail below, the yoke 110 is configured to both movably retain the shuttle 94 as well as guide axial movement of the shuttle 94.

With continued reference to FIGS. 8-9, the seal body 92 is generally open at its first end 98 and less open at the second end 100. In that regard, the base wall 108 at the second end 100 of the seal body 92 extends from the annular sidewall 102 in a radially inwardly direction to an upstanding annular lip 114 that encircles an opening 116 through which the shuttle 94 may move. To this end, the opening 116 has a diameter that is smaller compared to a diameter of the open first end 98 of the seal body 92. While the base wall 108 extends in a radially inwardly direction, as shown, the base wall 108 is also angled in an axially downward direction to form a cupped surface 118 that extends from the annular sidewall 102 to the upstanding annular lip 114. The cupped surface 118 and the upstanding annular lip 114 function as a weir to prevent small amounts of residual liquid product in the liquid supply cartridge 12 from traveling to the opening 116, for example. Further, as a result of this configuration, the base wall 108 and a portion of the annular sidewall 102 define a wedge-shaped annular pocket 120 at the second end 100 of the seal body 92. As will be described in further detail below, the annular pocket 120 is configured to mate with parts of a reservoir receptacle when the cartridge 12 is installed to the reservoir 14 of the liquid dispenser 10. In an alternative embodiment, the base wall 108 may extend in a radially inwardly direction so as to be generally perpendicular to the annular sidewall 102.

As briefly described above, the seal body 92 includes the centrally located yoke 110 that is configured to movably retain the shuttle 94. In the exemplary embodiment shown, the seal body 92 and the yoke 110 are formed as an integral unitary piece. With reference to FIGS. 8-9, the yoke 110 includes a plurality of L-shaped support legs 122 and a guide ring 124 configured to receive part of the shuttle 94, as will be described in further detail below. In the embodiment shown, the yoke 110 includes three support legs 122 that are spaced equidistantly apart about the upstanding annular lip 114. In that regard, each support leg 122 projects from the upstanding annular lip 114 and extends a distance in the axially upward direction to position the guide ring 124 of the yoke 110 at the first end 98 of the seal body 92. In particular, the support legs 122 position the guide ring 124 in a coaxial arrangement with the opening 116 formed in the base wall 108 of the seal body 92. As such, a central opening 126 of the guide ring 124 is coaxial with the opening 116 formed in the base wall 108. As will be described in further detail below, the shuttle 94 is configured to move within the opening 126 formed in the guide ring 124 and the opening 116 formed in the base wall 108.

As best shown in FIG. 9, the base wall 108 of the seal body 92 includes a base surface 128 having an annular rabbet 130 formed therein. The annular rabbet 130 is formed in the base surface 128 axially below the upstanding annular lip 114 such that the annular rabbet 130 extends from base surface 128 in the axially upward direction toward the upstanding annular lip 114. In that regard, the annular rabbet 130 terminates at an arcuate base 132 that extends partially into the upstanding annular lip 114. The annular rabbet 130 defines an annular seal member 134 that is configured to engage the shuttle 94. In particular, the annular seal member 134 defines the opening 116 configured to receive the shuttle 94, as will be described in further detail below. As shown, the seal member 134 extends in the axially downward direction from a neck region 136 to a terminal end 138 and includes a radially outer sidewall 140 that forms part of the annular rabbet 130 and an opposite radially inner sidewall 142. The radially inner sidewall 142 forms a continuous extension of a radially inner sidewall 144 of the upstanding annular lip 114 and includes an upper and a lower tapered wall portion 146a, 146b that together, with the inner sidewall 142, define a lip seal 148 configured to engage the shuttle 94 to substantially seal closed the opening 116. To this end, the seal member 134 is capable of flexing in a radially inwardly and a radially outwardly direction to facilitate sealing of the opening 116.

Referring again to FIGS. 8-9, the seal assembly 90 includes the shuttle 94 that is configured to be movably retained by the seal body 92. The shuttle 94 includes an elongate body or stem 150 that extends between a head 152 at one end and a plunger 154 at the other, opposite end. When installed to the seal body 92, the stem 150 of the shuttle 94 is configured to extend through the opening 126 formed in the ring guide 124 of the yoke 110, as shown in FIG. 9, for example. In that regard, the head 152 is generally frustoconical in shape having a base that defines a shoulder 156 configured to abut the ring guide 124 of the yoke 110. The head 152 further includes a U-shaped channel 158 that splits or divides the head 152 into a first leg portion 160 and an opposite second leg portion 162. The first and second leg portions 160, 162 facilitate installation of the shuttle 94 to the seal body 92. To this end, the shuttle 94 may be installed to the seal body 92 by inserting the shuttle head 152 first through the opening 116 in the base wall 108 and further pressing the head 152 through the opening 126 in the ring guide 124. The first and second leg portions 160, 162 may deform in a radially inwardly direction until the head 152 is moved through the opening 126 in the ring guide 124, at which point the leg portions 160, 162 spring back to their undeformed state. The engagement between the shoulders 156 of each leg portion 160, 162 and the ring guide 124 prevent the shuttle 94 from being pulled out of the yoke 110.

With continued reference to FIGS. 8-9, the shuttle 94 includes the plunger 154 which is configured to contact the seal member 134 of the seal body 92 to seal closed the opening 116. In that regard, the plunger 154 is located at an opposite end of the stem 150 from the head 152 of the shuttle 94 and is generally disc shaped, having a diameter that is closely sized, or slightly larger, compared to the diameter of the opening 116 such that the fit between the plunger 154 and the seal member 134 is a frictional or interference fit. As shown, the plunger 154 includes a top surface 164, a base surface 166, and a circumferential sidewall 168 that extends between the top surface 164 and the base surface 166. The shuttle 94 may include one or more gussets 169 that extend between the stem 150 and the top surface 164 of the plunger 154 to improve the structural strength of the shuttle 94. As best shown in FIG. 9, the sidewall 168 of the plunger 154 includes a chamfered surface 170 that extends between the top surface 164 of the plunger 154 and the sidewall 168. The sidewall 168 further includes a radiused surface 172 that extends between the sidewall 168 and the base surface 166 of the plunger 154. The plunger 154 further includes a socket 174 that is centrally formed in the base surface 166 of the plunger 154 that extends in the axially upward direction and partially into the stem 150 of the shuttle 94. The socket 174 is configured to receive an actuator that moves the shuttle 94 from a parked position to an opened position, as will be described in further detail below. However, in an alternative embodiment, the plunger 154 may not include the socket 174 but be configured as a generally flat surface configured to be contacted by a flat surface actuator to move the shuttle 94 from the parked position to the open position.

With continued reference to FIGS. 8-9, the biasing element 96 is configured to be sandwiched between the seal body 92 and the shuttle 94 for biasing the shuttle 94 in the axially downward direction toward the opening 116 in the base wall 108 of the seal body 92. In particular, the biasing element 96 is received about the stem 150 of the shuttle 94 and positioned between the shuttle 94 and the yoke 110. In that regard, a first end 176 of the biasing element 96 is received about the ring guide 124 and in an abutting relationship with the support legs 122 of the yoke 110 and an opposite, second end 178 of the biasing element 96 is received about the gussets 169 of the shuttle 94 and in an abutting relationship with the top surface 164 of the plunger 154. To this end, movement of the shuttle 94 in the axially upward direction compresses the biasing element 96. The biasing force exerted by the biasing element 96 forces the shuttle 94, and more particularly the plunger 154, into contact with the seal member 134 to substantially seal closed the opening 116.

Figure 10:
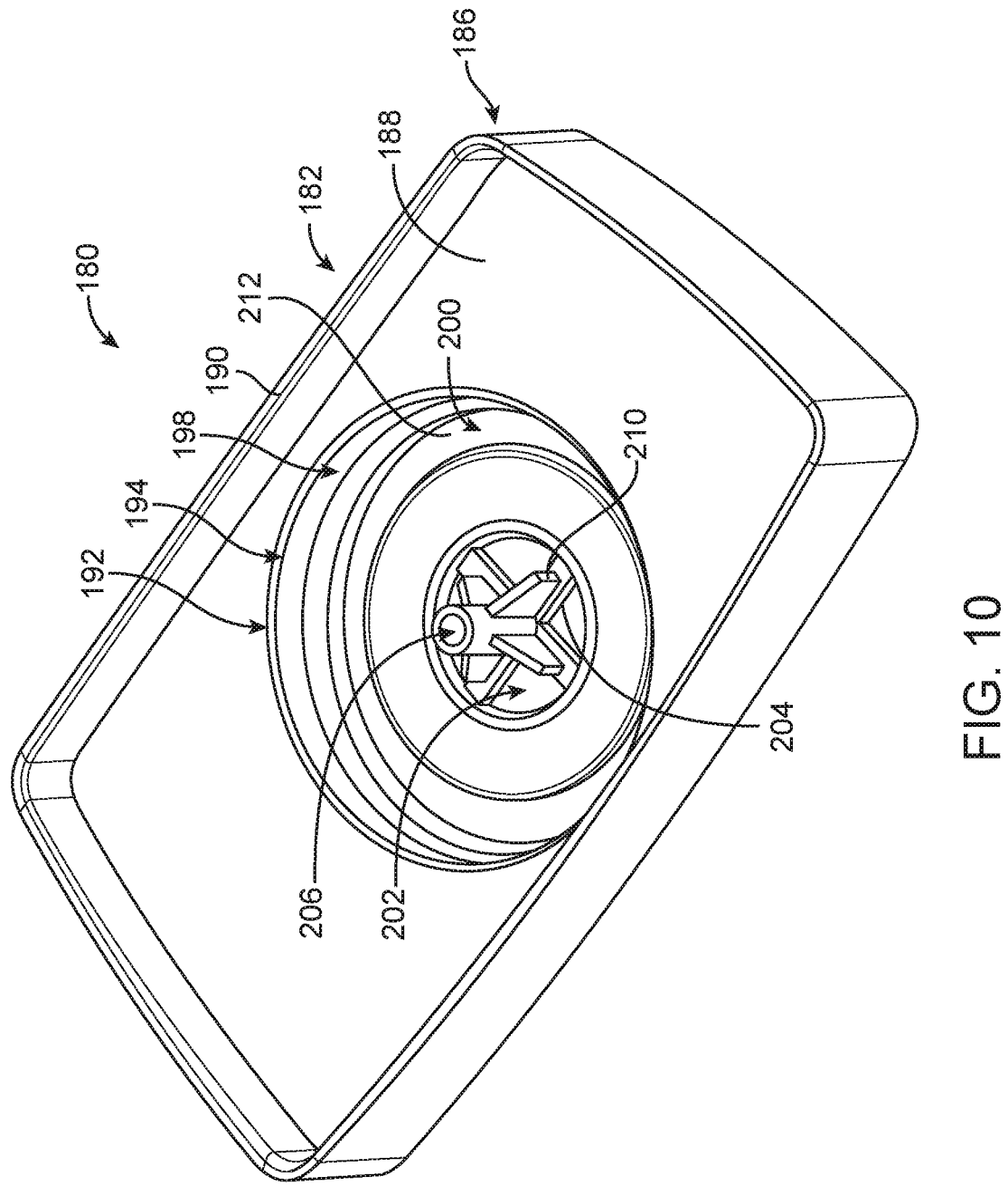
FIG. 10 is a perspective view of a receptacle that may be fit between the reservoir 14 and the liquid supply cartridge 12 to actuate the seal assembly in accordance with an embodiment of the invention.
Figure 11A:
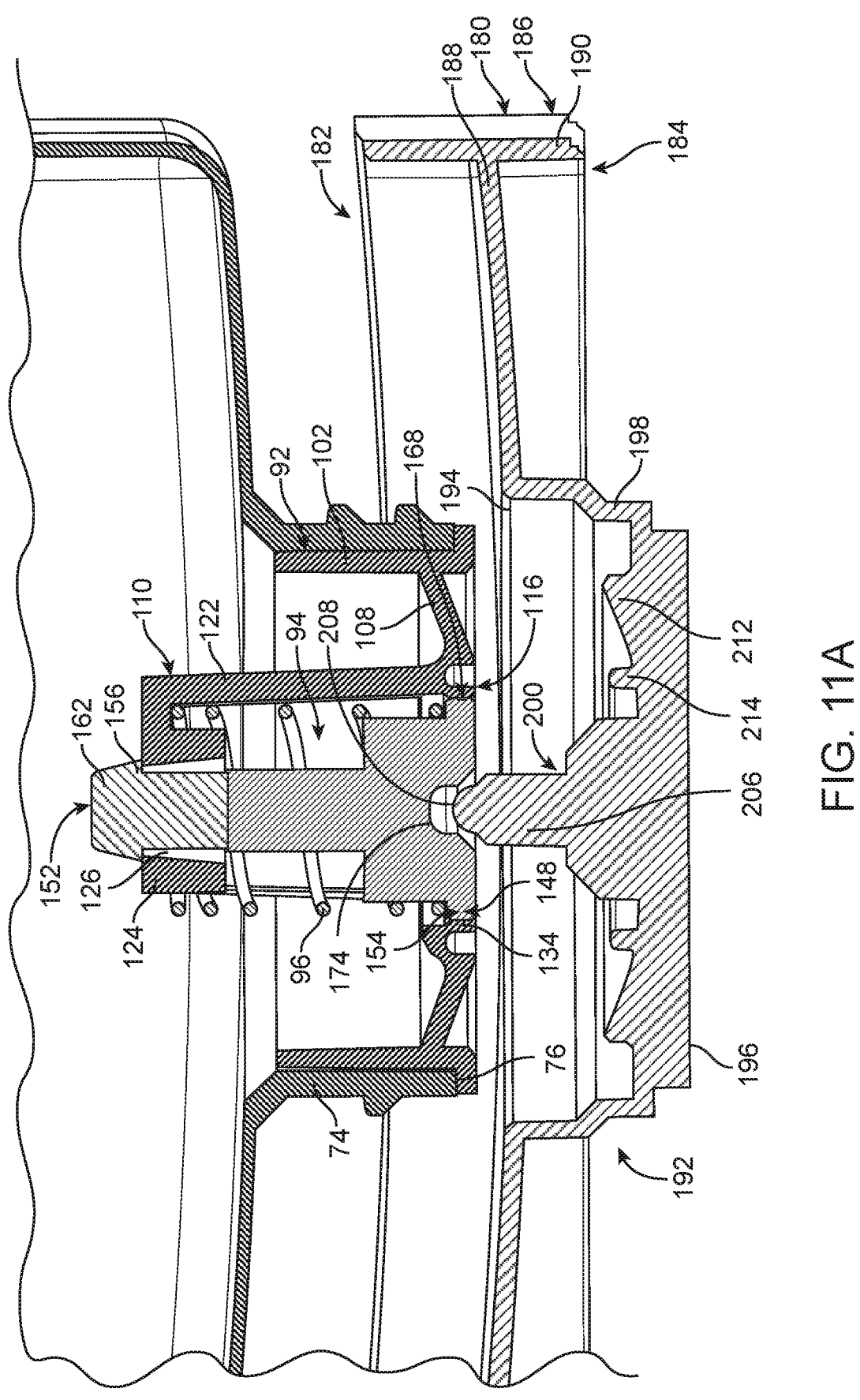
FIG. 11A is a cross-sectional view showing the liquid supply cartridge being received by the receptacle of FIG. 10, and further illustrating the seal assembly of FIGS. 5-9 in a parked position.
Figure 11B:
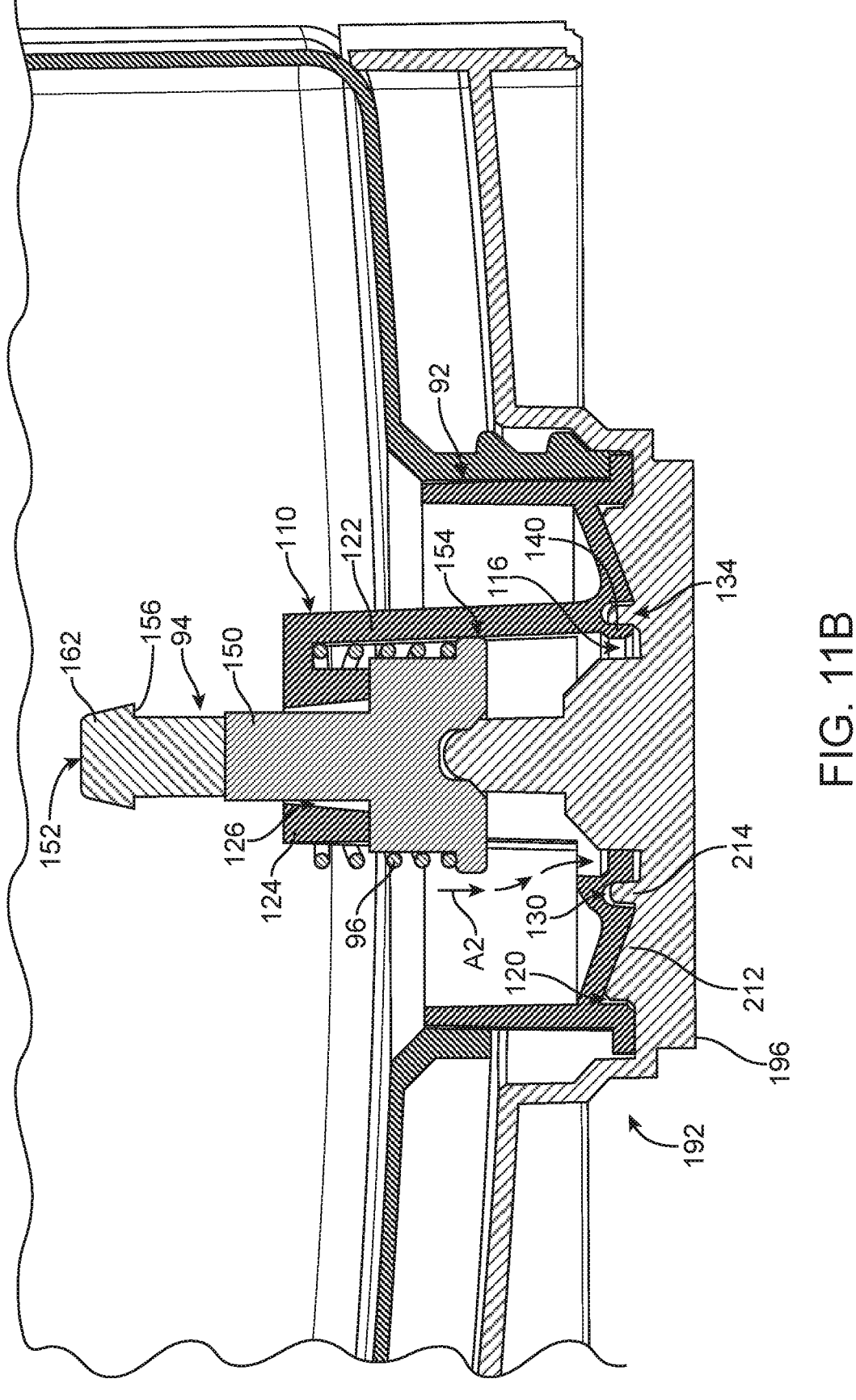
FIG. 11B is a view similar to FIG. 11A, showing the liquid supply cartridge received by the receptacle of FIG. 10, and further illustrating the seal assembly of FIGS. 5-9 in an opened position.
Figure 11C:
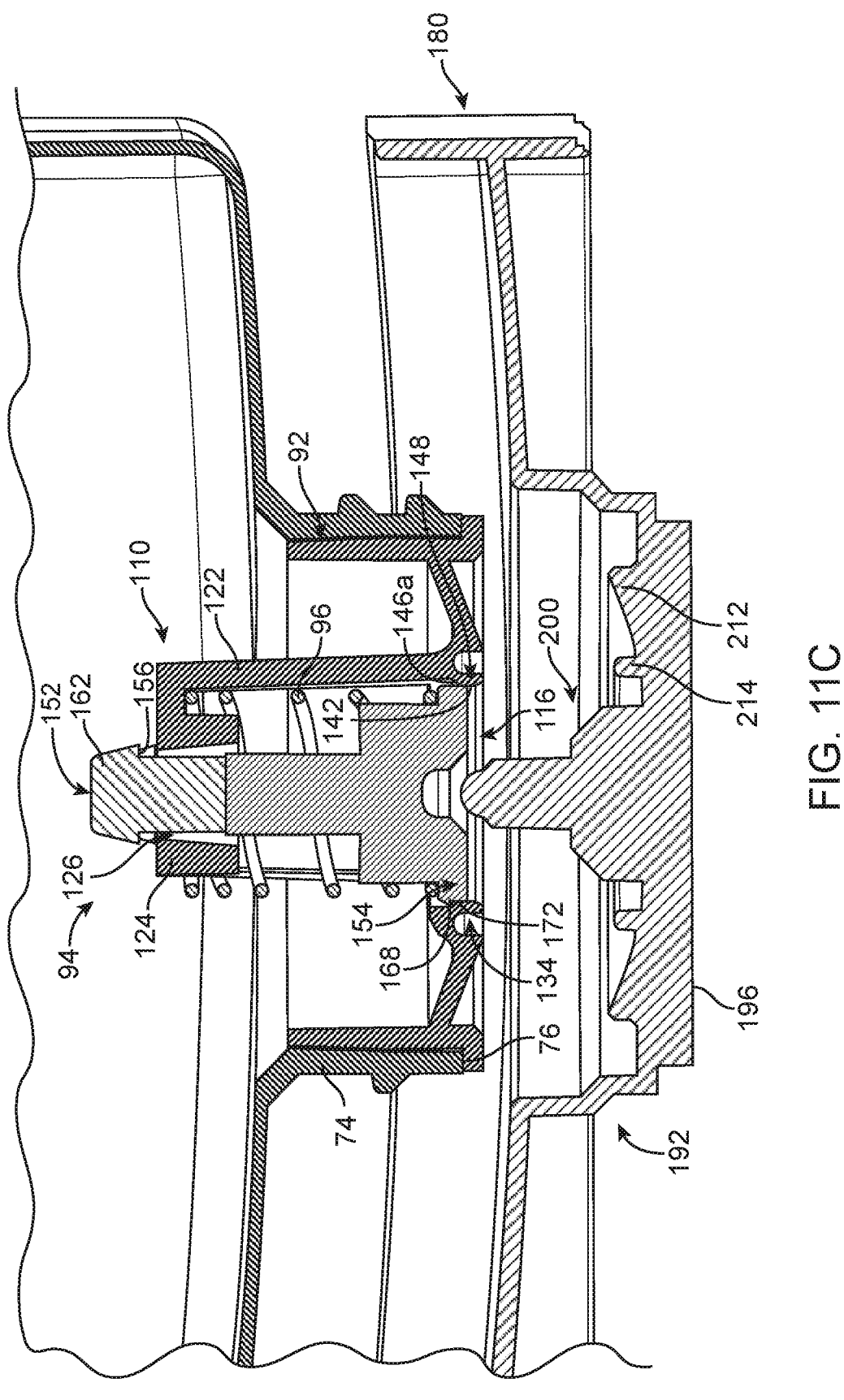
FIG. 11C is a view similar to FIGS. 11A-11B, showing the liquid supply cartridge being removed from the receptacle of FIG. 10, and further illustrating the seal assembly of FIGS. 5-9 in an intermediate closed position.

FIG. 10 illustrates a receptacle 180 that may be secured to the upper wall 48 of the reservoir 14, such as by sonic welding, for example, to facilitate the connection between the replaceable liquid supply cartridge 12 and the reservoir 14 in accordance with an embodiment of the invention. With reference to FIGS. 10-11C, the receptacle 180 is configured to engage the seal assembly 90 to move the shuttle 94 from a parked position to an opened position to place the liquid supply cartridge 12 in fluid communication with the reservoir 14. In that regard, the receptacle 180 is configured to be positioned between the liquid supply cartridge 12 and the reservoir 14 and includes a first side 182 configured to engage the liquid supply cartridge 12 and an opposite second side 184 configured to engage the reservoir 14. In particular, the receptacle 180 includes a plate-like body 186 that is generally rectangular or trapezoidal in shape and includes a deck 188 having an outer flange 190 that extends about a periphery of the deck 188. The receptacle 180 further includes a recessed hub 192 centrally formed in the deck 188. The recessed hub 192 extends from an opening 194 formed in the deck 188 to a base 196 located on the second side 184 of the receptacle 180. As shown, the recessed hub 192 includes a sidewall 198 that extends from the opening 194 to the base 196 of the recessed hub 192 in a generally stepped manner. To this end, the recessed hub 192 is sized to receive the neck 74 of the liquid supply cartridge 12 and thus generally conforms to the cross-sectional shape of the neck 74 (e.g., FIGS. 11A-11C). Further, the receptacle 180 is attached to the reservoir 14 such that the recessed hub 192 is received through the access port 56 formed in the upper wall 48 of the reservoir 14. In an alternative embodiment, the reservoir 14 may include the hub 192 formed in the port 56 so as not to require the use of a separate receptacle 180, for example.

With continued reference to FIGS. 10-11C, the receptacle 180 includes an actuator 200 configured to actuate the seal assembly 90, and more particularly the shuttle 94, of the liquid supply cartridge 12 to place the interior 72 of the liquid supply cartridge 12 in fluid communication with the interior 52 of reservoir 14. As shown, the actuator 200 is arranged in a central opening 202 that is formed in the base 196 of the recessed hub 192. The actuator 200 includes a number of horizontally extending supports 204 that divide the opening 202 into several smaller openings between each support 204. In the embodiment shown, the actuator 200 includes four supports 204 that form generally pie-shaped smaller openings 202. However, other configurations are possible, having fewer or more supports 204, for example. During use, the openings 202 permit the flow of liquid product between the liquid supply cartridge 12 and the reservoir 14. The actuator 200 further includes a post 206 that extends perpendicularly relative to the supports 204 and in an upward direction from the base 196 of the recessed hub 192 to a tip 208 that is positioned above the deck 188 on the first side 182 of the receptacle 180. The actuator 200 may include one or more gussets 210 that extend between the post 206 and each support 204 to improve the structural strength of the actuator 200. As best shown in FIG. 11A, for example, the base 196 of the recessed hub 192 includes an annular wedge-shaped projection 212 and an upstanding annular rib 214 that extend about the centrally formed opening 202 and the actuator 200. To this end, the wedge-shaped projection 212 forms a bowl around the centrally formed openings 202 and the actuator 200 to facilitate draining of any liquid into the openings 202. To this end, the upstanding annular rib 214 may include one or more channels or passageways to facilitate the flow of liquid past the annular rib 214 and into the openings 202. In an alternative embodiment, the base 196 of the recessed hub 192 may be generally flat without any raised surfaces.

Referring to FIGS. 11A-11C, operation of the seal assembly 90 will now be described. In that regard, the shuttle 94 is movable between at least the following positions: a parked position (FIG. 11A) where no liquid product is permitted to flow from the liquid supply cartridge 12 through the opening 116 in the seal body 92; an open position (FIG. 11B) where the shuttle 94 is in contact with the actuator 200 and liquid product is permitted to flow through the opening 116 in the seal body 92 and into the reservoir 14, for example; and an intermediate closed position (FIG. 11C) where substantially no liquid is permitted to flow from the liquid supply cartridge 12 through the opening 116 in the seal body 92. By substantially seal, it is meant that no volume or only a de minimis volume of liquid product containable by the receptacle 180, or less, leaks past the shuttle 94 and through the opening 116 when in the intermediate closed position, as noted above. That way, leakage is stopped or drastically reduced while the liquid supply cartridge 12 is being removed from the liquid dispenser 10 and until the liquid supply cartridge 12 can be placed in an upright position for disposal which is relatively short in duration (e.g., on the order of seconds). Each operational position of the seal assembly 90 will be described in turn below.

FIG. 11A illustrates the seal assembly 90 installed to the open end 76 of the neck 74 of the of the liquid supply cartridge 12 to seal liquid chemical product in the cartridge 12. The liquid supply cartridge 12 is full of liquid product and the seal assembly 90 has not yet been engaged by the actuator 200 of the receptacle 180. In that regard, the seal assembly 90, and more particularly the shuttle 94, is considered to be in the parked position. When so positioned, the plunger 154 of the shuttle 94 is fully seated within the opening 116 formed in the base 108 of the seal body 92 so as to engage the seal member 134. Specifically, the sidewall 168 of the plunger 154 is in contact with the lip seal 148 of the seal member 134 to form a fluid tight seal therebetween to seal liquid product within the liquid supply cartridge 12. The engagement between the plunger 154 and the seal member 134 may be an interference fit such that when the plunger 154 is positioned within the opening 116, the plunger 154 presses against the seal member 134 to flex the seal member 134 in a radially outwardly direction. When the shuttle 94 is in the parked position, the head 152 of the shuttle 94 may be in an abutting or near-abutting relationship with the ring guide 124 to prevent the plunger 154 from being overextended through the opening 116. The seal assembly 90 may be placed in the parked position during manufacturing and installed to the liquid supply cartridge 12 while in the parked position, for example. To this end, the radiused surface 172 that extends between the sidewall 168 and the base surface 166 of the plunger 154 may facilitate movement of the plunger 154 to the parked position. In one embodiment, an audible indication, such as a click, may be produced when the shuttle 94 is moved to the parked position. As described in further detail below, the shuttle 94 may not return to the parked position once activated or opened by the actuator 200.

Referring now to FIGS. 11A-11B, to install the liquid supply cartridge 12 to the receptacle 180 and the reservoir 14, the liquid supply cartridge 12 is aligned vertically over the receptacle 180 and the reservoir 14, as shown. In particular, the neck 74 and the seal assembly 90 are vertically aligned with the recessed hub 192, as shown in FIG. 11A. The liquid supply cartridge 12 is then lowered into engagement with the receptacle 180, as shown in FIG. 11B. When so positioned, the neck 74 of the liquid supply cartridge 12 is received in the recessed hub 192 such that the actuator 200 engages the shuttle 94 of the seal assembly 90. In particular, the tip 208 of the actuator 200 is received within the socket 174 formed in the plunger 154. The downward force of the liquid supply cartridge 12 results in the shuttle 94 being moved from the parked position to the opened position shown in FIG. 11B.

The locking mechanism 30 may be used to hold the liquid supply cartridge 12 in engagement with the receptacle 180 and to maintain the opened position of the seal assembly. When in the opened position, the plunger 154 is disengaged from the seal member 134 and removed from the opening 116 to compress the biasing element 96 between the shuttle 94 and the yoke 110, as shown in FIG. 11B. The actuator 200 maintains the opened position of the seal assembly 90 for as long as the liquid supply cartridge 12 is installed to the receptacle 180 and the reservoir 14. To this end, product in the liquid supply cartridge 12 may freely flow from the liquid supply cartridge 12, around the shuttle 94 and through the opening 116 in the seal body 92, and into the reservoir 14, as shown by directional arrows A2. As product flows from the liquid supply cartridge 12 and into the reservoir 14, air in the reservoir 14 is displaced and travels through the seal assembly 90 and the remaining liquid product in the liquid supply cartridge 12 (e.g., as bubbles) and collects at the upper end of the liquid supply cartridge 12. As product is dispensed from the liquid dispenser 10, more and more air is collected in the liquid supply cartridge 12 until all the product in the liquid supply cartridge 12 is depleted. The flow of product from the liquid supply cartridge 12 to the reservoir is stopped once the reservoir 14 is completely filled with product and no more air is available to be displaced. When the reservoir 14 is full of product, the recessed hub 192 of the receptacle 180 may be immersed in the product held in the reservoir 14, for example.

When the liquid supply cartridge 12 is installed to the receptacle 180, as shown in FIG. 11B, the seal body 92 is placed in contact with the base 196 of the recessed hub 192. Specifically, the annular wedge-shaped projection 212 and the upstanding annular rib 214 of the recessed hub 192 are received within the wedge-shaped annular pocket 120 and the annular rabbet 130 of the seal body 92, respectively. To this end, the engagement between the annular rabbet 130 and the upstanding annular rib 214, in combination with the cup-shaped engagement between the seal body 92 and the base 196 of the recessed hub 192, facilitate the connection and the fluid transfer between the liquid supply cartridge 12 and the reservoir 14.

FIG. 11C illustrates the liquid supply cartridge 12 removed from the receptacle 180. In that regard, the liquid supply cartridge 12 may be depleted or partially depleted of liquid product and removed from the liquid dispenser 10 to be replaced with a new, un-used cartridge 12. In either case, as the liquid supply cartridge 12 is pulled away from the receptacle 180 for removal, and in particular the actuator 200, the shuttle 94 is permitted to move in the axially downward direction to substantially seal closed the opening 116. In particular, the force exerted on the shuttle 94 by the biasing element 96 moves the shuttle 94 toward the opening 116. Once the neck 74 of the receptacle 12 has been removed from the recessed hub 192 of the receptacle 180, as shown, the shuttle 94 is moved back into engagement with the seal member 134 of the seal body 92 to substantially seal closed the opening 116. In that regard, the seal assembly 90, and more particularly the shuttle 94, is considered to be in the intermediate closed position. When so positioned, the plunger 154 of the shuttle 94 is held in some level of contact with the lip seal 148 of the seal member 134 by the biasing element 96 but less than full contact as in the parked position. In particular, the radiused surface 172 of the plunger 154 is pressed into engagement with the upper tapered wall portion 146*a* of the lip seal 148 of the sealing member 134. This engagement creates at least a partial seal between the plunger 154 and the seal member 134 to thereby prevent or limit to a de minimis amount any leakage or spillage of residual liquid product held in the liquid supply cartridge 12 through the opening 116 in the seal body 92 as the cartridge 12 is being removed from the receptacle 180. Further, as the plunger 154 is biased into engagement with the seal member 134, it is possible that the seal member 134 flex in a radially outward direction such that radiused surface 172 of the plunger 154 moves past the upper tapered wall portion 146*a* of the lip seal 148 and a portion of the sidewall 168 of the plunger 154 is moved into contact with a portion of the inner sidewall 142 of the seal member 134. However, the shuttle 94 may not return to the parked position illustrated in FIG. 11A.

Figure 12:
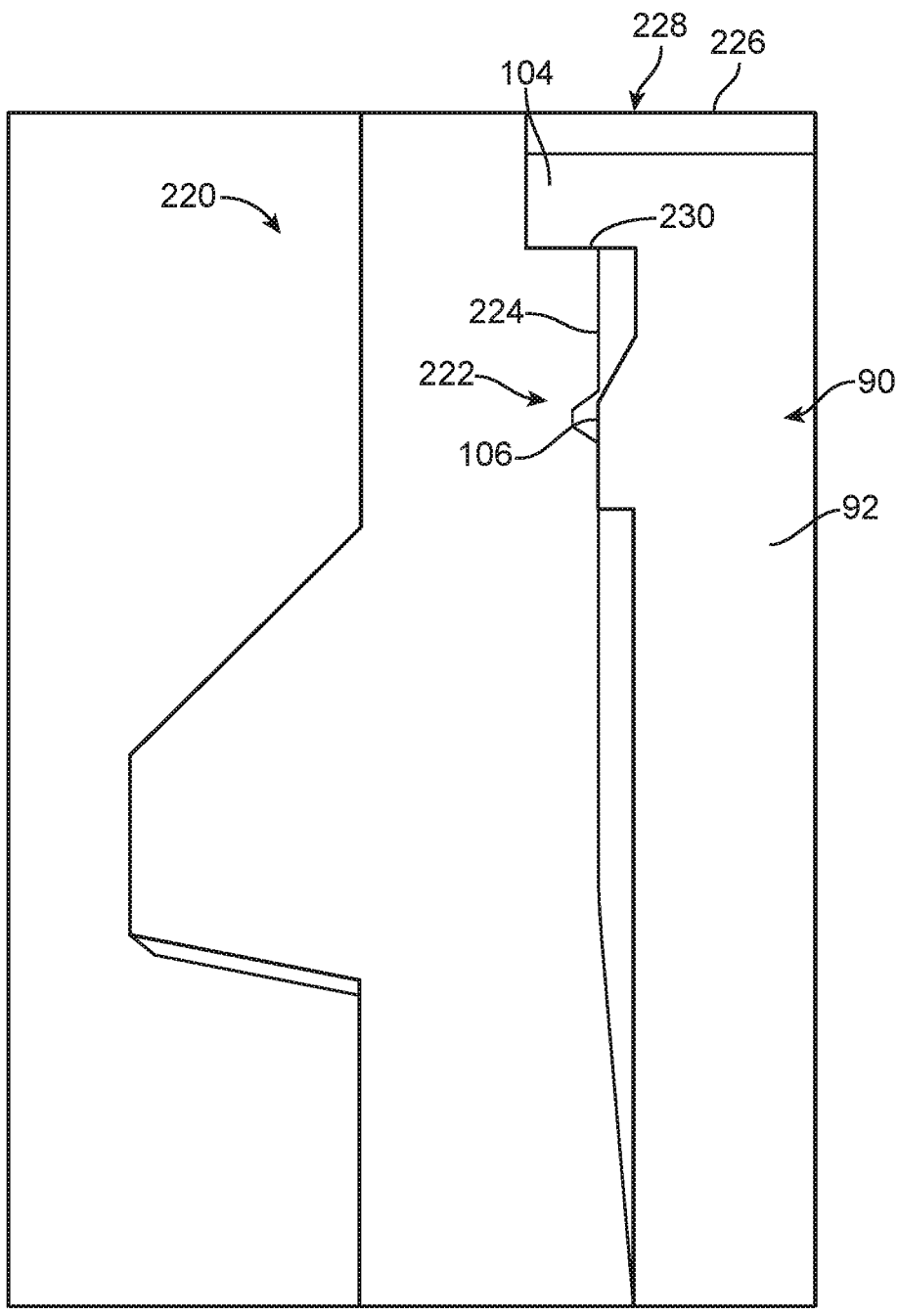
FIG. 12 is an enlarged cross-sectional view illustrating the engagement between the seal assembly of FIGS. 5-9 and a neck of the liquid supply cartridge in accordance with another embodiment of the invention.

FIG. 12 is an enlarged cross-sectional view illustrating the engagement between the seal assembly 90 and a neck 220 of the liquid supply cartridge 12 in accordance with another embodiment of the present invention. As shown, the neck 220 is similar in many respects to the neck 74 described above with respect to FIGS. 1-11C, however, the neck 220 includes an annular groove 222 formed in a radially inner sidewall 224 proximate an open end 226 of the neck 220. The annular groove 222 is sized to receive the annular rib 106 of the seal body 92 of the seal assembly 90 to retain the seal assembly 90 within the neck 220 of the liquid supply cartridge 12, as shown. Furthermore, the seal assembly 90 is configured to be completely received within the open end 226 of the neck 220 of the liquid supply cartridge 12. In that regard, the open end 226 of the neck 220 includes a counterbore 228 configured to receive the flange 104 of the seal assembly 90. As shown, the flange 104 may be in an abutting or near abutting relationship with an annular ledge 230 defined by the counterbore 228 when the seal assembly 90 is fully received within the neck 220. The seal assembly 90 is considered to be fully received within the neck 220 when the annular rib 106 of the seal assembly 90 is received within the annular groove 222 of the neck 220, as shown. The recessed nature configuration of the seal assembly 90 results in a small gap or space 232 being formed between the open end 226 of the neck 220 of the liquid supply cartridge 12 and the second end 100 of the seal body 92. The recessed configuration of the seal assembly 90 allows for a cap having a liner, such as a Polytetrafluoroethylene (PTFE) or cardboard liner, for example, to be received by the neck 220 without any change to the integrity of the connection and the seal formed between the cap and the neck 220 of the cartridge 12. Thus, current cap arrangements may be used even in the presence of the seal assembly 90 since the seal assembly 90 is recessed and does not interfere with the cap.

Figure 13:
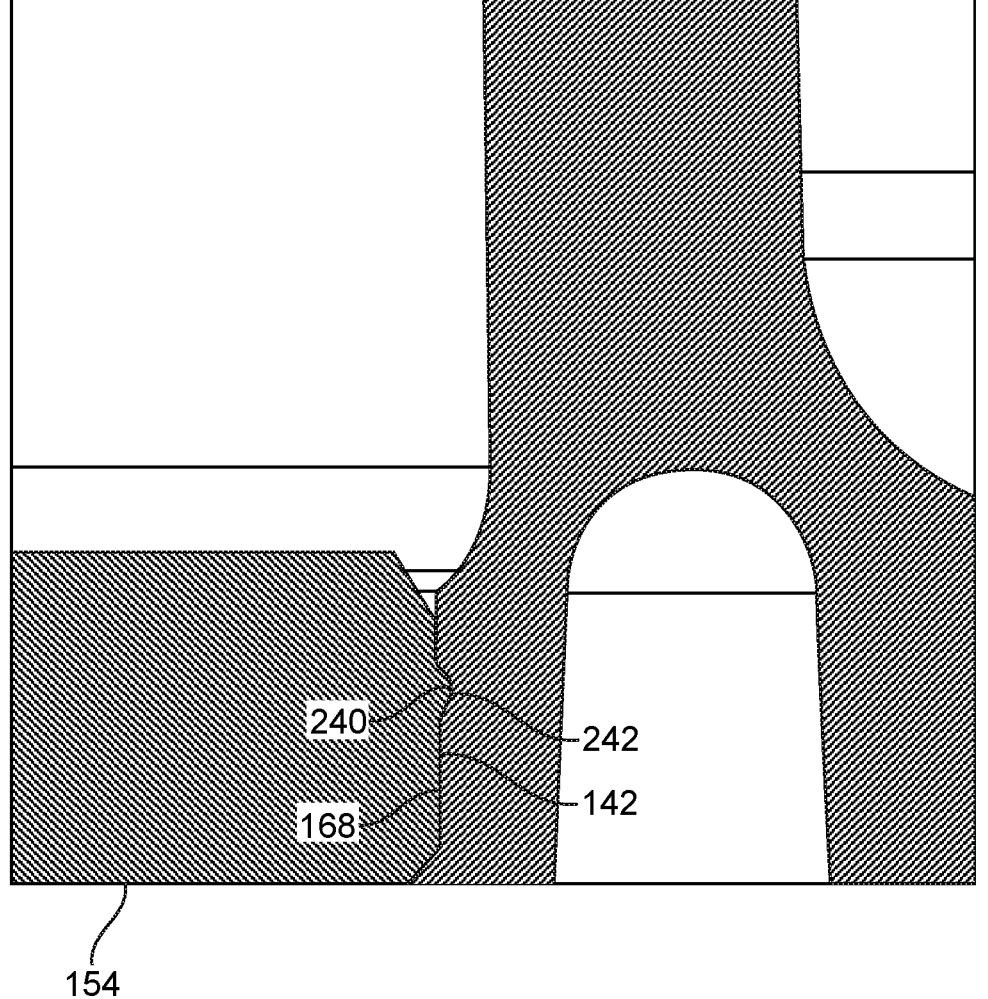
FIG. 13 is an enlarged cross-sectional view of the seal assembly of FIGS. 5-9 illustrating the seal assembly in a parked position in accordance with some embodiments of the present disclosure.

FIG. 13 is an enlarged cross-section view illustrating engagement between the plunger 154 and the annular seal member 134. The circumferential sidewall 168 of the plunger 154 includes an external annular rib 240. The inner sidewall 142 includes an annular groove 242 configured to receive the annular rib 240 when the shuttle 94 is in a parked position. The external annular rib 240 serves to retain the shuttle 94 in the parked position when the external annular rib 240 is engaged in the annular groove 242.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A seal assembly for selectively sealing an open end of a liquid supply cartridge that is configured to be received within a liquid dispenser for dispensing a metered dose of liquid product held in the liquid supply cartridge, the seal assembly comprising:

a seal body configured to be received within the open end of the liquid supply cartridge, the seal body including an annular sidewall that extends between a first end and an opposite second end that includes a base wall having an opening defined by an annular sealing member, and a yoke that projects from the base wall so as to be coaxial with the opening and a central axis of the seal assembly;

a shuttle movably retained within the seal body by the yoke and including a plunger configured to seal closed the opening, the shuttle being movable between at least a parked position wherein the plunger is fully received within the opening, an open position wherein the plunger is removed from the opening, and an intermediate closed position wherein the plunger is partially received within the opening and in contact with the annular sealing member to substantially seal closed the opening; and a biasing element located between the shuttle and the yoke for biasing the shuttle in a direction toward the opening formed in the base wall of the seal body.

2. The seal assembly of claim 1, wherein the base wall of the seal body includes an upstanding annular lip that encircles the opening.

3. The seal assembly of claim 2, wherein the base wall extends from the annular sidewall to the upstanding annular lip in an axially downward direction to form a cupped surface.

4. The seal assembly of claim 1, wherein the shuttle includes a stem that extends between a head at one end of the shuttle and the plunger at an opposite end, the stem configured to be received by the yoke.

5. The seal assembly of claim 4, wherein the head includes a channel that divides the head into a first leg portion and an opposite second leg portion.

6. The seal assembly of claim 4, wherein the yoke includes a plurality of support legs and a guide ring, the plurality of support legs being spaced equidistantly about the opening to position the guide ring coaxial with the opening, the guide ring being configured to movably receive the stem of the shuttle.

7. The seal assembly of claim 6, wherein the head portion of the shuttle defines a shoulder configured to abut the guide ring to prevent the removal of the shuttle from the guide ring.

8. The seal assembly of claim 1, wherein the base wall of the seal body includes a base surface having an annular rabbet formed therein that defines the seal member.

9. The seal assembly of claim 8, wherein the seal member extends from a neck region to a terminal end and includes a radially outer sidewall that forms part of the annular rabbet and an opposite radially inner sidewall that defines the opening.

10. The seal assembly of claim 9, wherein the inner sidewall of the seal member includes a lip seal configured to engage the plunger of the shuttle.

11. The seal assembly of claim 10, wherein the lip seal is defined by an upper and a lower tapered wall portion.

12. The seal assembly of claim 11, wherein the plunger includes a base surface, a circumferential sidewall, and a radiused surface that extends between the base surface and the circumferential sidewall, wherein the circumferential sidewall of the plunger is in contact with the seal member when in the parked position and the radiused surface of the plunger is in contact with the seal member when in the intermediate closed position.

13. The seal assembly of claim 12, wherein the radiused surface of the plunger is in contact with the upper tapered portion of the lip seal when in the intermediate closed position.

14. The seal assembly of claim 12, wherein the base surface of the plunger includes a socket formed therein that is configured to receive an actuator for moving the shuttle from the parked position to the opened position.

15. The seal assembly of claim 1, including a wedge-shaped annular pocket at the second end of the seal body.

16. The seal assembly of claim 15, wherein the wedge-shaped annular pocket is formed between the base wall and a portion of the annular sidewall.

17. The seal assembly of claim 1, wherein the annular sidewall of the seal body includes an external annular rib configured to be received within an annular groove formed in a radially inner sidewall of the open end of the liquid supply cartridge.

18. The seal assembly of claim 1, wherein the second end of the annular sidewall of the seal body includes an annular flange.

19. The seal assembly of claim 1, wherein a wall thickness of the annular sidewall is greater at the second end compared to the first end such that the wall thickness tapers in a direction from the second end to the first end.

20. A liquid dispenser, comprising:
a housing configured to receive a liquid supply cartridge comprising a seal assembly for selectively sealing an open end of the liquid supply cartridge, the seal assembly comprising:
a seal body configured to be received within the open end of the liquid supply cartridge, the seal body including an annular sidewall that extends between a first end and an opposite second end that includes a base wall having an opening defined by an annular sealing member, and a yoke that projects from the base wall so as to be coaxial with the opening and a central axis of the seal assembly;
a shuttle movably retained within the seal body by the yoke and including a plunger configured to seal closed the opening, the shuttle being movable between at least a parked position wherein the plunger is fully received within the opening, an open position wherein the plunger is removed from the opening, and an intermediate closed position wherein the plunger is partially received within the opening; and
a biasing element located between the shuttle and the yoke for biasing the shuttle in a direction toward the opening formed in the base wall of the seal body,
a reservoir disposed in the housing and configured to hold a volume of a liquid product, wherein the reservoir includes an access port for receiving the open end of the liquid supply cartridge to place the liquid supply cartridge and the reservoir in fluid communication when the liquid supply cartridge is inserted into the housing; and
a receptacle disposed in the housing and between the liquid supply cartridge and the reservoir, the receptacle including a recessed hub having an actuator arranged in an opening formed in a base of the recessed hub, wherein the recessed hub is received in the access port of the reservoir and configured to receive the open end of the liquid supply cartridge such that the actuator is configured to move the shuttle from the parked position to the open position to place the liquid supply cartridge and the reservoir in fluid communication.

21. The liquid dispenser of claim 20, wherein a base surface of the plunger includes a socket formed therein that is configured to receive the actuator for moving the shuttle from the parked position to the opened position.

22. The liquid dispenser of claim 20, wherein the recessed hub includes an upstanding annular rib that extends circumferentially about the opening and the actuator.

23. The liquid dispenser of claim 22, wherein the base wall of the seal body includes a base surface having an annular rabbet formed therein that defines the seal member, the annular rabbet being configured to receive the upstanding annular rib of the receptacle such that a fluid seal is formed between the seal member and the upstanding annular rib.

24. The liquid dispenser of claim 20, wherein the recessed hub includes an annular wedge-shaped projection that extends circumferentially about the opening and the actuator.

25. The liquid dispenser of claim 24, wherein the seal assembly includes a wedge-shaped annular pocket at the second end of the seal body that is configured to receive the annular wedge-shaped projection of the receptacle.

* * * * *